United States Patent Office 3,294,952
Patented Dec. 27, 1966

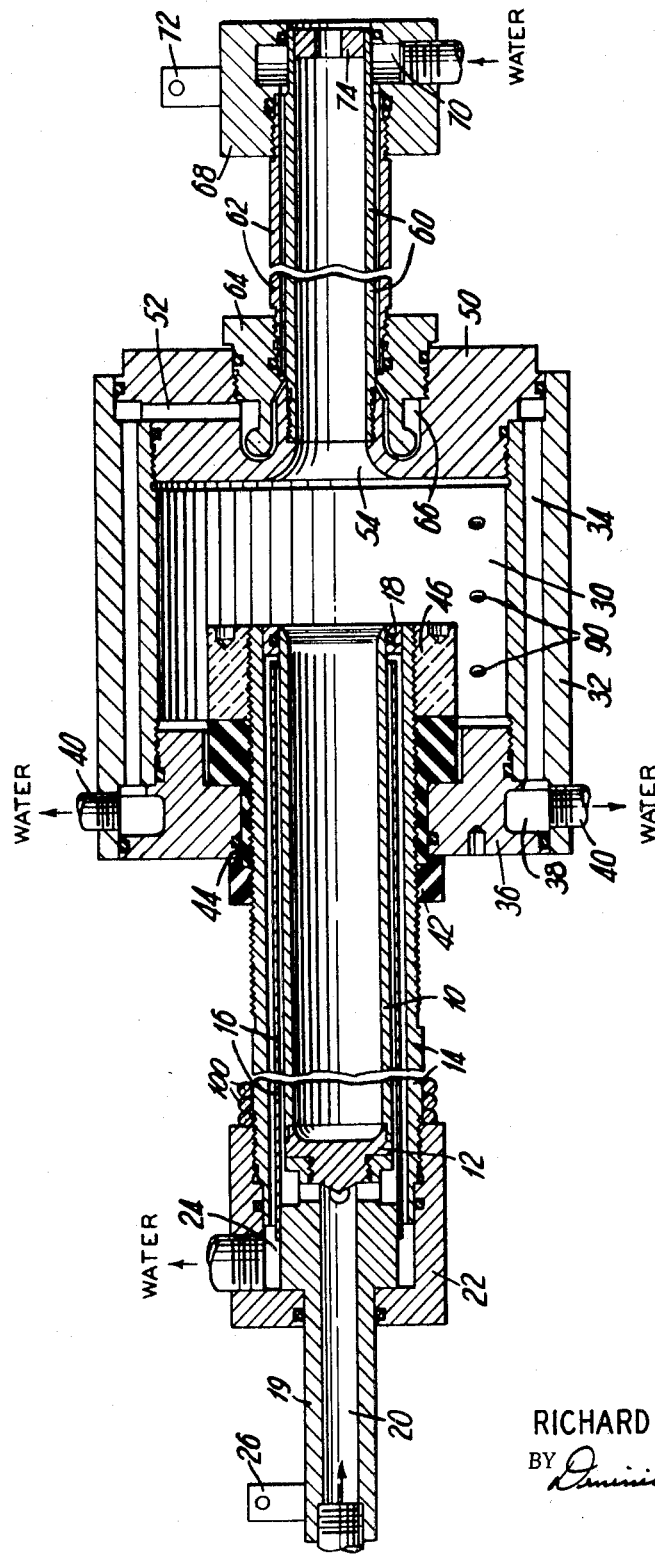

3,294,952
METHOD FOR HEATING GASES
Richard C. Eschenbach, Indianapolis, Ind., assignor to Union Carbide Corporation, a corporation of New York
Filed Sept. 25, 1963, Ser. No. 311,493
4 Claims. (Cl. 219—121)

This invention relates to a method for heating gases, having an oxidizing component, to extremely high temperatures and discharging such gases at extremely high temperatures. More particularly, this invention relates to heating gases such as air, oxygen and carbon monoxide.

Present day industrial technology has developed to the extent that research and test procedures often must be conducted under simulated conditions in the laboratory before tests under actual conditions can be made. Simulating such conditions on a laboratory basis can be, in many cases, extremely difficult. The aviation industry, for example, encompassing the field of space exploration, missile development, propulsion equipment, etc., must produce gas velocities of many times the speed of sound and/or temperatures far exceeding the melting points of most common construction materials for such laboratory tecting. Devices capable of producing such gas velocities and temperatures on a laboratory basis are largely unobtainable. The advantages to be gained from such testing devices are obvious in terms of making it possible to pretest airframe shapes, material durability at elevated temperatures and the like. Such pretesting is, of course, necessary to the protection of human life and the successful operation and recovery of extremely expensive unmanned vehicles.

Electric arcs have been used to heat gases to high temperatures. The problem has been to achieve a method wherein a maximum amount of power supplied to the arc device is transferred to the gas being heated. Another problem encountered when heating gases having an oxidizing component such as air, oxygen or carbon monoxide is the erosive effect such gases have on the electrodes.

One way of increasing the amount of power transferred to the gas being heated is to increase the arc voltage. Devices for producing high voltages have been available. For example, a high voltage arc device has been used to crack lower hydrocarbons to acetylene. Such a device has been used in Huls, Germany. In this device, an arc is established between a cup-shaped back electrode and a tubular front electrode. A hydrocarbon feed gas is introduced through tangential slots into a chamber positioned between the two electrodes. The maximum temperature of the reaction gases is about 1600° C. The swirl flow produced by introducing gas through tangential slots was used to keep the arc from remaining at one point and burning through the electrode. However, the criticality of the strength of the swirl flow for producing increased voltages and thus an increase in the amount of power transferred to the gas to be heated was not realized. I have found that the swirl must have a minimum strength if gases such as air are to be heated with maximum conversion of power going into the gas.

For the purpose of this disclosure and the claims appended hereto, a strong swirl within the scope of the invention is obtained when the following equation is satisfied:

(1) $Dc/De \times$ tangential component of Mach $\geq 1$ wherein $Dc$ = inside diameter of the circle formed by the tangential injection means;

$De$ = inside diameter of the front electrode; and

Mach number is the velocity of the gas introduced through the tangential injection means divided by the velocity of sound for the gas at the temperature and pressure of inlet.

In satisfying the above equation, the value of the $Dc/De$ ratio in Equation 1 is desirably between 1 and 8. However, the preferred value of the ratio is about 4.

Several factors affect the strength of the swirl at the boundary of the arc column, interacting in such a manner that the critical range of the parameter $(Dc/De)$ should be maintained between 1 and 8. At values less than about 1, insufficiently strong swirls are generated, while at values greater than about 8, flow energy loss mechanisms due in part to wall friction seriously reduce the strength of the swirl in the gas in the region near the arc where the strong swirl is needed.

I have found also that when heating a gas having an oxidizing component such as air, oxygen or carbon monoxide the electrodes must be fabricated from at least one metal taken from the class consisting of copper, aluminum, silver, tungsten, molybdenum and alloys thereof. The oxidizing component of the gas will react with the electrode material to produce a suitable emitting material over the arc termination zone on the electrode, such coating being continually renewed, thus reducing the tendency for electrode erosion.

Accordingly, it is the main object of this invention to provide a method for heating a gas having an oxidizing component with the apparatus of the type referred to above.

Another object is to provide a method for heating a gas having an oxidizing component wherein a maximum amount of the power provided to the device is transferred to the gas at a given current and flow rate.

Yet another object is to provide a method for heating air, oxygen and carbon monoxide.

These and other objects will either be pointed out or become apparent from the accompanying description and drawing wherein the sole figure is a side elevation in cross section of typical apparatus for carrying out the method of the invention.

Accordingly, the invention is based on the discovery that gases taken from the class consisting of air, oxygen, and carbon monoxide can be heated to increased temperatures at a given flow rate and current in an electric arc gas heater comprising a water-cooled cup-shaped electrode and tubular water-cooled nozzle electrode open at both ends and axially spaced from the open end of the cup electrode; a water cooled chamber of substantially greater diameter than and surrounding the space between said two electrodes, at least one tangential gas injection means in the walls of said chamber for introducing gas to be heated; said electrodes being fabricated from at least one metal taken from the class of metals consisting of copper, aluminum, tungsten, silver and molybdenum by the method of producing a strong swirl gas flow which includes as a step introducing the gas to be heated into said chamber such that the ratio of the diameter of the circle formed by the tangential injection means to the inside diameter of the front electrode times the tangential component of the Mach number is equal to or greater than 1.

Referring now to the drawing, a preferred embodiment of the present invention will be described. The device comprises a hollow cup shaped electrode 10 open at one end and provided with a closure member 12 at the other. The electrode is supported within a water cooled holder 14 spaced from said electrode 10 and forming an annular chamber therebetween. A thin walled tube 16 extends within the chamber stopping short of one end thereof to form a coolant flow path therein. A closure 18 closes the forward end of said chamber and forms a seal between the electrode 10 and holder 14. Member 19 forms a closure between the tube 16 and the other end of electrode 10 and also is provided with coolant inlet path 20 for supplying coolant to the annular space between electrode 10 and tube 16. Member 22 provides a closure between the other end of electrode holder 14 and member 19 and forms a coolant outlet chamber 24 therebetween. Current lug 26 is affixed to member 20 for supplying arc power to the electrode 10. Chamber 30 surrounds and extends beyond the open end of cup shaped electrode 10. The chamber 30 is formed by hollow cylindrical member 32 having a plurality of coolant passages 34 therein. Closure means 36 is provided at one end of the chamber 30 adjacent the cup shaped electrode 10 and has chamber 38 therein connecting with the coolant passages 34 in member 32 and water outlet means 40. Heat shield 46 and insulators 42 and 44 are threaded to electrode holder 14. This combination is then properly positioned with respect to chamber 30 through member 36 which threadedly engages cylindrical member 32. As will be seen, members 42 and 44 electrically insulate the cup electrode assembly from the chamber structure and the nozzle electrode assembly. The end of chamber 30 opposite from electrode 10 is closed by member 50 which also provides coolant inlet passage 52 for coolant passages 34. A cylindrical nozzle electrode 60 threadedly engages an opening 54 in the center of member 50. The nozzle electrode 60 is surrounded by a cylindrical holder member 62 spaced from said nozzle electrode and forming an annular coolant passage therebetween. Member 64 threadedly engages holder 62 and member 50 and functions to close the one end of the annular coolant passage and forms a chamber 66 with member 50 for directing coolant from the annular passage to passages 52 in member 50 and thence into passages 34. Member 68 closes the other end of the annular coolant passage between electrode 60 and holder 62 and is provided with coolant inlet passages 70 and lug 72 for supplying arc current to the electrode 60. Nozzle insert 74 may be used where it is desired to build up gas pressure within the chamber or gas exit velocities from the torch.

A plurality of tangential apertures 90 are preferably provided in the wall of the chamber in member 32 to permit air or other gases to be supplied to the chamber 30. In this case, the inside diameter of the tangent circle De is the inside diameter of the chamber.

Further, the gas to be heated can be introduced, for example, through tubes inserted in the walls of the chamber. In this case, the diameter Dc of tangent circle would be the diameter of the circle drawn tangent to the longitudinal axis of the gas injection means.

An operating cycle of the invention will now be described with reference to the drawing. In this preferred embodiment of the invention, a small amount of air or other gas is introduced into the chamber 30 through a plurality of tangential apertures 90 so as to impart a swirling motion to the air. A portion of the air flows into and out of the tubular cup shaped electrode 10 from whence it combines with the remainder of the gas. The total flow then passes through the electrode nozzle 60, the flow at all times being in a swirling or vortex fashion. When these tangential apertures are used to impart a swirling or vortex flow of gas through the device, it has been found that a strong swirl as defined above must be achieved in order to obtain satisfactory gas heating efficiency. That is, for a given gas flow and current, if the swirl is not of the type defined by the equation $$\frac{Dc}{De} \times \text{tangential component of Mach} \geq 1$$

the arc voltage is not enough to efficiently heat the gas. Efficiency is measured in terms of electrical power going into the gas emerging from the torch divided by the electrical power delivered to the torch.

An appropriate power supply is connected to the cup electrode through member 19 at lug 26 and to the nozzle electrode 60 by any suitable means 72. Alternating current, or direct current with straight or reverse polarity, may be used as desired. The arc can be established by creating a short circuit between the two electrodes by some suitable means. For example, a carbon rod could be inserted through the end of the nozzle electrode 60. The arc that is finally established will extend from an area along the wall of the cup electrode 10 to an area along the length of the nozzle electrode 60 by means which will be discussed subsequently.

In order to develop greater gas or air pressure so as to obtain greater velocities, a constriction 74 preferably made of copper may be inserted at the nozzle exit. The inside diameter of the constriction would be determined by the amount of chamber pressure that is desired or can be maintained.

The cup electrode 10 is water cooled by injecting cooling water from the inlet 20 around and through the annular space formed by the tube 16 and the electrode 10 and then through the annular space formed by the tube 61 and the electrode holder 14 and then through the outlet 24. The nozzle electrode and the chamber are likewise cooled by the injection of cooling water from the inlet 70 around and through the space between electrode 60 and holder 62 and then through the passages 34 and then out the outlet 40. It should be understood that the direction of the water flow could be reversed.

It is highly desirable in electric arc devices to keep electrode erosion to a minimum. This erosion generally occurs when the arc localizes itself on one "spot" of the electrode. It is particularly critical in the cup-shaped electrode of the present apparatus. Specifically, the arc tends to center at the bottom of the cupped section of the electrode. Such concentration of the arc will "eat away" the cupped section through erosion.

This erosion has been minimized by selecting a combination of electrode materials and arc gases such that a suitable emitting coating is continuously formed over the arc termination zone. In addition, a copper field coil 100 is provided around cup electrode 10 to locate the arc along the side wall of the electrode rather than have it localized at a spot at the bottom of the cup. Such coil may be cooled by any suitable means with water cooling being preferred. The field coil may be either connected in series to the power supply of the electrodes or it may have a separate supply of its own.

A further advantage of the field coil is to increase the current carrying capacity of the electrodes. Specifically, for a given electrode area there can only be so much current applied to that area before melting or severe arc erosion occurs. By using the field coil, or a plurality of field coils, the arc will in conjunction with the swirl flow, rapidly rotate the current rather than have it concentrated in a localized area or "spot." Thus, the effective arc area will be increased so as to permit high overall current with workable current densities.

The following are examples illustrating the concept of the invention.

*Example I*

There was no field coil used in this run. The cup electrode was 10" long and had a 1½" I.D. The nozzle electrode was 18" long and had a 1" I.D. This is De in Equation 1. The inside diameter of the chamber (Dc) was 4⅞". With the nozzle acting as the cathode, 400 amperes (D.C.) was supplied to the device. Air was supplied tangentially to the chamber so as to create a vortex flow, through 6 apertures, 3/32" in diameter, with 3 apertures being evenly spaced on opposite sides of the chamber. The air was supplied at a rate of 2750 c.f.h. and at a calculated inlet velocity of Mach 1.00 (1000 ft./sec.) at a resulting pressure within the chamber of 14 p.s.i.g. The strength of the swirl was 4⅞ when calculated from Equation 1. Under these conditions, the total power developed was 308 kw., the arc voltage was 770 v., the power to the gas was 210 kw., the enthalpy of the gas was 3300 B.t.u./lb., the calculated gas exit velocity was 2000 ft./sec., and the efficiency based on the power to the gas was 68%. The arc effluent was green, indicating some electrode erosion.

*Example II*

All of the conditions in this example were the same as in Example I, excepting the addition of a water cooled field coil near the bottom of the cup electrode. The magnetomotive force was 4 kiloampere turns and the direction of the field was toward the bottom of the cup electrode. Under these conditions, the total power developed was 316 kw., the arc voltage was 790 v., the power to the gas was 218 kw., the enthalpy of the gas was 3400 B.t.u./lb., the calculated gas exit velocity was 2100 ft./sec., and the efficiency based on the power to the gas was 69%. The arc effluent was blue indicating no electrode erosion. It further appeared from visual observation after the device was torn down that the arc was spread over an area on the sides of the cup electrode near the bottom rather than being concentrated at a point at the bottom of the cup.

Comparison of these two examples indicates that the field coil may increase the arc voltage as well as reduce electrode erosion. It is noted that the resulting power increase was substantially all transferred to the gas effluent.

*Example III*

In this run, the rear copper electrode had a 1.5 inch I.D. and a length of 16 inches, while the front copper electrode had an I.D. of 1.5 inches $D_e$ in Equation 1 and a length of 20 inches. The inside diameter of the swirl chamber was 5 inches, the air inlets being positioned such that the diameter of the tangent circle ($D_c$) was 4.75 inches. The nozzle electrode had a throat diameter of .505 inch. Air was supplied tangentially at Mach 1 to yield a vortex flow at a rate of 6700 c.f.h. The strength of the swirl was 3.17 as calculated from Equation 1. With the front electrode acting as the cathode, 400 amperes was supplied to the device. The arc voltage was 2040 v. The chamber pressure was 137 p.s.i.a. The total power to the torch was 816 kw. of which 603 went to the gas yielding a torch efficiency of 74 percent. The calculated gas exit velocity after expansion to a pressure of one atmosphere was 8150 ft./sec. The gas chamber temperature and enthalpy were 5000° K. and 4100 B.t.u./lb., respectively. The arc effluent was blue indicating very little electrode erosion.

What is claimed is:
1. A method for heating gases having an oxidizing component with an electric arc gas heater having a water-cooled cup-shaped electrode and tubular water-cooled nozzle electrode open at both ends and axially spaced from the open end of the cup electrode; a water cooled chamber of substantially greater diameter than and surrounding the space between said two electrodes, at least one tangential gas injection means in the walls of said chamber for introducing gas to be heated; said electrodes being fabricated from at least one metal taken from the class of metals consisting of copper, aluminum, tungsten, silver, molybdenum and alloys thereof, said method comprising introducing the gas to be heated into said chamber such that the ratio of the diameter of the circle formed by the tangential injection means to the inside diameter of the front electrode times the tangential component of the Mach number is equal to or greater than 1 with the proviso that said ratio has a maximum value of 8.

2. A method for heating gases taken from the class consisting of air, oxygen and carbon monoxide with an electric arc gas heater having a water-cooled cup-shaped electrode and tubular water-cooled nozzle electrode open at both ends and axially spaced from the open end of the cup electrode; a water cooled chamber of substantially greater diameter than and surrounding the space between said two electrodes, at least one tangential gas injection means in the walls of said chamber for introducing gas to be heated; said electrodes being fabricated from at least one metal taken from the class of metals consisting of copper, aluminum, tungsten, silver, molybdenum and alloys thereof, said method comprising introducing the gas to be heated into said chamber such that the ratio of the diameter of the circle formed by the tangential injection means to the inside diameter of the front electrode times the tangential component of the Mach number is equal to or greater than 1 with the proviso that said ratio has a maximum value of 8.

3. A method for heating gases having an oxidizing component with an electric arc gas heater having a water-cooled cup-shaped electrode and tubular water-cooled nozzle electrode open at both ends and axially spaced from the open end of the cup electrode; a water cooled chamber of substantially greater diameter than and surrounding the space between said two electrodes, at least one tangential gas injection means in the walls of said chamber for introducing gas to be heated; said electrodes being fabricated from at least one metal taken from the class of metals consisting of copper, aluminum, tungsten, silver, molybdenum and alloys thereof, said method comprising introducing the gas to be heated into said chamber such that the ratio of the diameter of the circle formed by the tangential injection means to the inside diameter of the front electrode times the tangential component of the Mach number is equal to or greater than 1 with the proviso that said ratio has a maximum value of 4.

4. A method for heating gases taken from the class consisting of air, oxygen and carbon monoxide with an electric arc gas heater having a water-cooled cup-shaped electrode and tubular water-cooled nozzle electrode open at both ends and axially spaced from the open end of the cup electrode; a water cooled chamber of substantially greater diameter than and surrounding the space between said two electrodes, at least one tangential gas injection means in the walls of said chamber for introducing gas to be heated; said electrodes being fabricated from at least one metal taken from the class of metals consisting of copper, aluminum, tungsten, silver, molybdenum and alloys thereof and an electric field coil circumferentially surrounding at least one of said electrodes said method comprising introducing the gas to be heated into said chamber such that the ratio of the diameter of the circle formed by the tangential injection means to the inside diameter of the front electrode times the tangential component of the Mach number is equal to or greater than 1 with the proviso that said ratio has a maximum value of 8.

References Cited by the Examiner

UNITED STATES PATENTS 3,077,108   2/1963   Gage et al.

OTHER REFERENCES

"Manufacture from Hydrocarbons"; Encyclopedia of Chemical Technology, vol. 1, 1947, p. 108.

JOSEPH V. TRUHE, *Primary Examiner.*